Dec. 23, 1969  P. J. WILDER  3,485,393
APPARATUS FOR HANDLING MATERIAL HAVING AN IRREGULAR
SURFACE AND VACUUM HEAD THEREFOR
Filed May 25, 1967  2 Sheets-Sheet 2
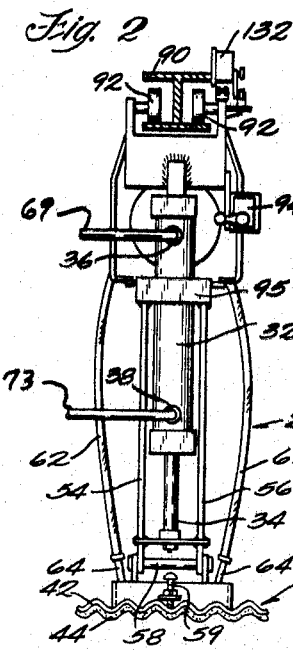
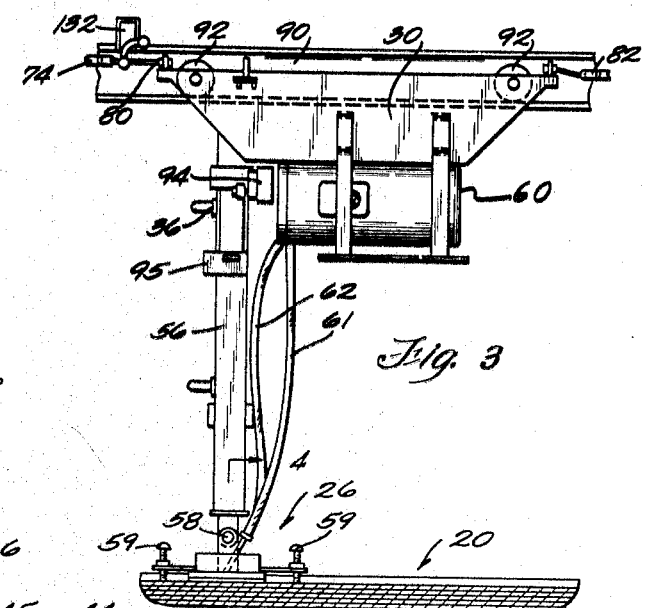
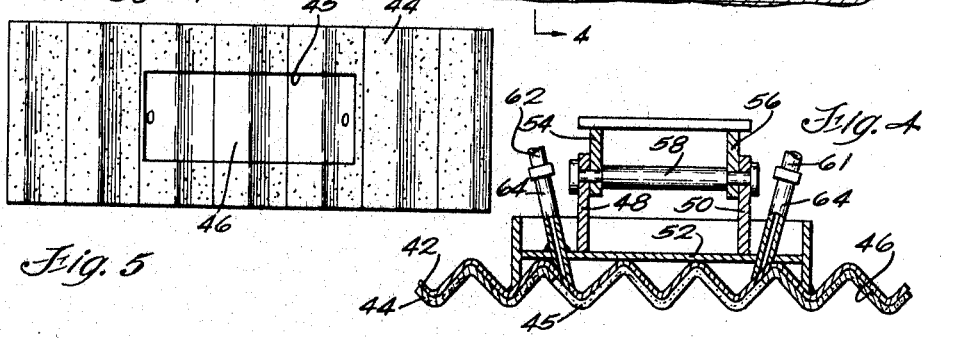
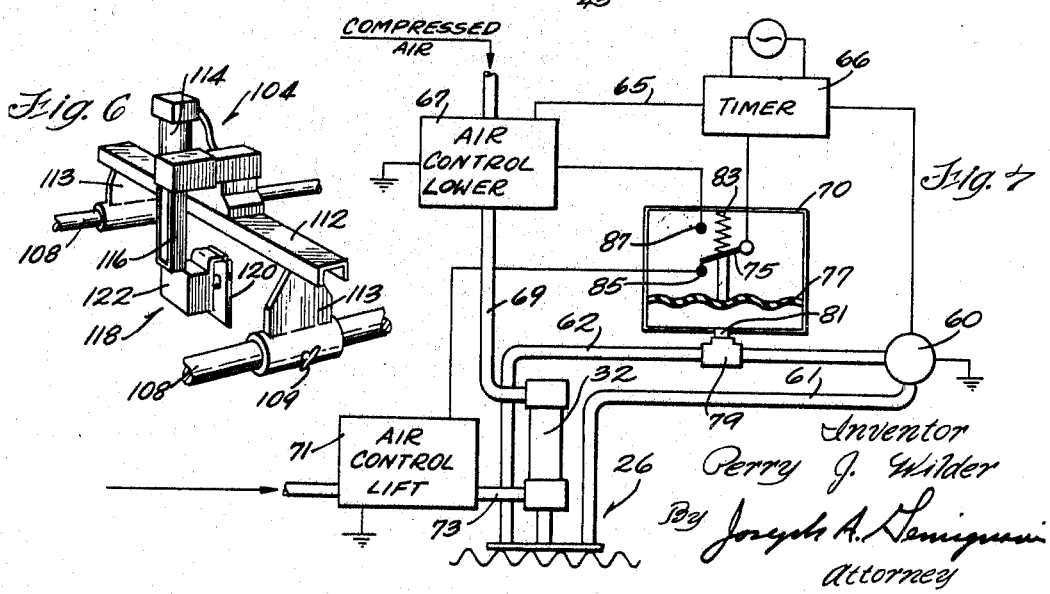
Inventor
Perry J. Wilder
By Joseph A. Genigni
Attorney

United States Patent Office 3,485,393
Patented Dec. 23, 1969

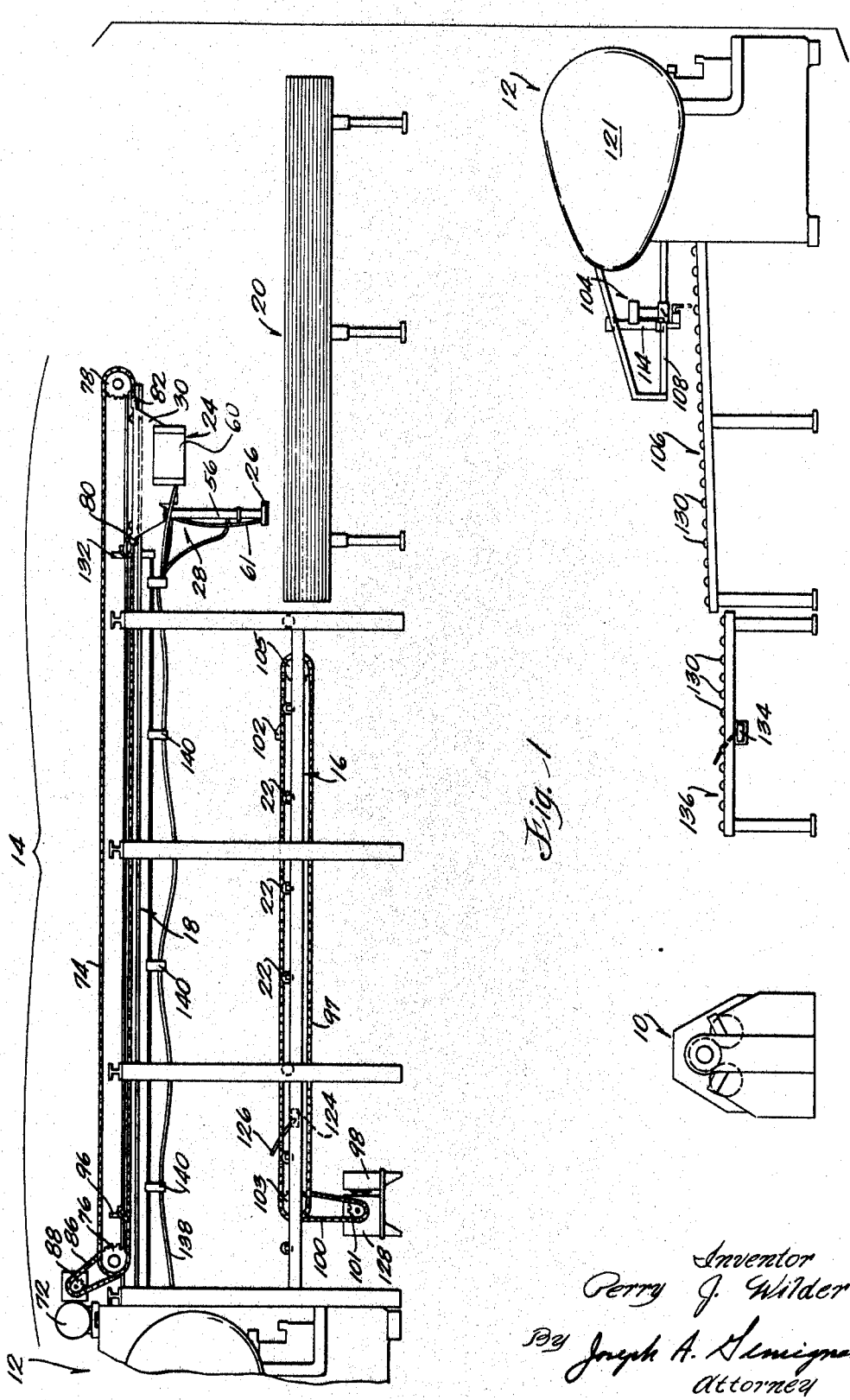

3,485,393
APPARATUS FOR HANDLING MATERIAL HAVING AN IRREGULAR SURFACE AND VACUUM HEAD THEREFOR
Perry J. Wilder, Waukesha, Wis., assignor to Waukesha Culvert Company, Waukesha, Wis., a corporation of Wisconsin
Filed May 25, 1967, Ser. No. 641,368
Int. Cl. B65h 3/08, 5/02
U.S. Cl. 214—89                    13 Claims

ABSTRACT OF THE DISCLOSURE

This disclosure relates to an automated transfer and cutting machine for delivering corrugated sheet sections cut in preselected lengths to a rolling machine where the cut sections are suitably formed for use in corrugated pipes. The transfer portion of the machine includes a vacuum head shaped to conform to the cross section of the corrugated sheet. This vacuum head is moved into engagement with sheet stock, a vacuum is drawn between the head and the sheet and the sheet is then transferred by means of the vacuum head to the cutter portion of the machine. The sheet is accurately positioned in the cutter for the desired length of cut, the cut is made and the severed section is automatically conveyed to the rolling machine. The accurate positioning, cutting and transferring of cut sections is repeated until the initial sheet is completely cut as desired. Delivery of sheets to the cutter continues automatically and the cutting operation is coordinated with the rolling operation so that the cut sections are delivered to the rolling machine only as needed.

BACKGROUND OF INVENTION

Field of invention

This invention relates specifically to automated transfer and cutting of corrugated sheet stock in connection with an additional operation such as, for example, rolling the cut stock to form pipe sections. More generally, the invention relates to the transfer of single sheets of stock which have an irregular surface or cross section.

Description of prior art

With regard to a specific application of this invention of providing corrugated pipe sections, corrugated sheets generally come in standard lengths which may or may not correspond to the length necessary to produce a pipe section of desired diameter. Generally, the sheets must be cut to length and oftentimes two or three sections are cut from a standard length sheet. The practice in the past has been to feed the standard length sheets manually into a cutter where they are cut to the desired length and the cut sections are then transported by an operator to a rolling machine. All transfer and locating operations were basically manual thereby requiring a number of operators and being extremely time consuming.

The conveyor art, or more generally the material transfer art, provides various arrangements for transferring single sheets of material. However, none of these is capable of effectively handling material having an irregular surface or cross section. One type of prior device relies on vacuum attachment to pick up a single sheet, these require a flat surface for operation. Another type uses a magnetic head and these are generally complex and do not positively insure picking up one sheet each time the device is operated for the reason that the magnetic field may penetrate more than one sheet. Basically, the magnetic types are not well suited to use in connection with irregular surfaces because of the limited amount of area available for contact; however, they are the more logical choice when compared to heretofore known vacuum devices.

SUMMARY OF INVENTION

This invention provides automated apparatus for handling corrugated sheet stock, specifically in connection with an operation wherein a given sheet is cut into smaller sections. The sheets are processed on a generally unitary machine including a cutter and a transfer unit for delivering a single sheet at a time to the cutter. Preferably, the cutter and transfer unit are used in conjunction with a rolling machine where the cut sections are rolled for use as corrugated pipe sections and a conveyor is provided for automatically transferring cut sections to the rolling machine. The sheets are accurately positioned at the cutter to produce sections of the desired length and the machine is automated to repeatedly cut sections of the same length from the sheet until the entire sheet is consumed. A new sheet is then automatically delivered to the cutter for another series of cuts. The cutting operation is preferably coordinated with the rolling machine so that cut sections are delivered for rolling only as needed.

Specifically, the transfer unit of the overall machine relies on vacuum type operation to deliver one sheet at a time to the cutter. The transfer unit includes a vacuum head which is provided with an irregular work engaging face conforming to the particular work piece or sheet to be handled. In the case of corrugated sheet, the vacuum head has a corrugated work engaging face. The work engaging face of the vacuum head is defined by a structure which is capable of making a seal with the corrugated surface and thereby permit a vacuum to be drawn in the vacuum head on the surface of the sheet. This permits the transfer unit to repeatedly pick up one sheet at a time for transfer.

DESCRIPTION OF DRAWINGS

FIG. 1 is a side elevation of the overall machine;
FIG. 2 is a front elevation of the trolley and lift and vacuum head assembly;
FIG. 3 is a side elevation of the trolley and lift and vacuum head assembly;
FIG. 4 is a section view generally along lines 4—4 of FIG. 3;
FIG. 5 is a bottom view of the vacuum head;
FIG. 6 is a partial view, in perspective, of the sheet limit stop assembly; and
FIG. 7 is a generally schematic view of a portion of the control circuitry for the machine.

DESCRIPTION OF PREFERRED EMBODIMENT

The apparatus embodying this invention is illustrated in combination with sheet rolling machine 10. The rolling machine is of conventional construction and consists of a number of rollers into which an operator feeds individual sheets. The operator manipulates each sheet as it is drawn through the rollers so that the sheet comes out of the rolling machine in the form of a cylindrical tube for use as a pipe section. The sections can then be joined to form an elongated pipe for use in a culvert, for example. The corrugated sheet stock is generally available in standard lengths which oftentimes do not correspond to the length necessary for a particular pipe diameter. This necessitates cutting the sheet stock to length before rolling. In the illustrated arrangement a conventional cutter 12 is provided to divide the sheet stock into sections of the desired length. Since both the rolling machine and cutter can be of any conventional construction, the details of which are not essential to an understanding of this invention, they will not be specifically described herein. It will also be noted at this point that this invention has application in fabrication systems other than that illustrated but since it offers particular advantages in connection with cutting and rolling corrugated sheet material to provide corrugated pipe sections, it will be discussed in that environment.

A primary consideration in this arrangement is to insure delivery of one sheet at a time to the cutter for the cutting operation and to achieve this delivery automatically and in coordination with the remaining operations. This delivery of sheets is accomplished by cutter feed conveyor section 14 disposed to the right of cutter 12 in FIG. 1. Conveyor section 14 includes a frame supported bed 16 and a frame superstructure 18. A sheet stacking area 20 is positioned to the right of conveyor section 14. The support bed includes a plurality of horizontally spaced rollers 22 arranged to facilitate movement of sheets from stacking area 20 to the cutter.

A trolley 24 is supported from the superstructure 18 and carries a vacuum head 26 and a lift assembly 28 which is operative to move the vacuum head vertically to engage and pick up sheets in the stacking area. The trolley includes a base frame 30 to which various operational elements for raising and transferring the sheets art connected, the base frame in turn being supported on superstructure 18 in a manner to be described more completely hereinafter. The lift assembly includes a double acting air cylinder 32, the ram 34 of which can be extended or retracted by introduction of air into the cylinder through couplings 36 and 38, respectively.

Vacuum head 26 includes a base plate 42 which is characterized by an irregular lower surface 46, or cross section, which conforms to shape of the corrugated sheets. As best illustrated in FIGS. 4 and 5, base plate 42 consists of a series of undulations and has a pad 44 attached to its lower surface 46. As illustrated, the pad is rectangular and is attached to base plate 42 such that it is characterized by a series of undulations corresponding to those of the base plate. The central portion of the pad is removed to provide cutout 45 but the remainder of the pad extends in the nature of a continuous strip around the cutout. This forms a depression at the sheet engaging surface of the vacuum head which will function as a vacuum area. Pad 44 is made of a resilient material, for example rubber or the like, and provides the medium through which the vacuum head engages the sheets. The resiliency in pad 44 permits a tight seal with the sheet stock around the area of the sheet stock which is overlaid by the vacuum head so that a vacuum can be drawn between the sheet and vacuum head in the vacuum area. Although the vacuum head base plate has the same general cross section as the corrugated sheet and will therefore mate closely with the sheets, the resilient pad will accommodate any minor irregularities in either the base plate or the sheet to provide a more closely conforming engagement. Base plate 42 can be a section of sheet of the type being handled by the machine, for example where corrugated sheet is being handled it too can be a section of corrugated sheet. Furthermore, by having conforming base plate and resilient pad sealing pressure is distributed uniformly over the pad to insure an adequate seal.

Vacuum head 26 is connected to the outer end of ram 34. Structurally, this connection consists of brackets 48, 50 attached to support block 52 which is in turn connected to base plate 42 and brackets 54 and 56 which are connected to ram 34. Pin 58 extends freely through openings in the brackets to establish the connection between the brackets but leaving the vacuum head free for pivotal movement about the pin, namely about an axis which extends normal to the undulations of the vacuum head. With this arrangement selective operation of the air cylinder will extend ram 34, with the vacuum head attached, to engage the top sheet of those stored in the stacking area. A vacuum is then drawn in the sealed vacuum area defined by vacuum head base plate 42, pad 44 and the sheet itself. After the vacuum is drawn the air cylinder is actuated to retract the ram and raise the vacuum head to lift the uppermost sheet from the stack.

The vacuum is drawn by vacuum motor 60 which is supported on base frame 30 of the trolley and is connected to the vacuum head through tubes 61 and 62 and couplings 64 extending through support block 52 and base plate 42 into cutout 45 in pad 44. The operation at this point is basically timer controlled. Timer 66 is illustrated schematically in FIG. 7 and would generally be mounted on a control panel (not shown) adjacent conveyor section 14. Under the control of the timer, i.e., through circuit 65 and air control 67, air is admitted into cylinder 32 through line 69 to move the vacuum head into engagement with the top sheet with sufficient pressure to make an air tight seal between the pad and sheet. The timer also energizes vacuum motor 60 and maintains the lift assembly in its down position for a period of time selected as being sufficient under normal conditions to achieve a vacuum in the vacuum head. After this time period, the circuit to air control 67 is interrupted and a circuit is made to the "lift" air control 71 and air is introduced into cylinder 32 through line 73 to retract the ram and lift the vacuum head and top sheet provided a vacuum has been drawn.

The control and lift mechanism also includes an auxiliary control which responds to the presence or absence of a vacuum at the vacuum head to either permit operation to continue from this point if a sheet has been picked up or to interrupt the lift cycle and relower the vacuum head if for any reason an adequate vacuum was not drawn so that a sheet had not been picked up. As illustrated, this auxiliary control consists of a vacuum switch 70 exposed to the condition in one of the vacuum lines 62 and connected in circuit with air "lower" and "lift" controls 67 and 71. As illustrated in a generally schematic form, vacuum switch 70 is a double throw switch and, when a vacuum is present, a circuit from the timer to control 71 is completed for raising ram 34. A vacuum switch of conventional construction can be used. As illustrated, movable switch blade 75 is connected to diaphragm 77. The underside of the diaphragm is exposed to a pressure condition corresponding to the pressure condition in line 62 by virtue of coupling 79 and line 81. Spring 83 urges the blade toward contact 85 and, so long as the condition below the diaphragm corresponds to a vacuum, the blade engages contact 85. Should the sheet not be picked up the vacuum will be broken and line 62 and the vacuum switch will be exposed to substantially atmospheric pressure. This pressure will overcome spring 83 and move switch blade 75 to contact 87, interrupting the circuit to the "lift" control and making a circuit to the "lower" control. Thus if a sheet is securely adhering to the vacuum head the lifting operation will continue. In the event that a sufficient vacuum was not drawn prior to the lifting operation so that the sheet is not raised, or should the sheet fall from the vacuum head at any time, switch 70 will interrupt the circuit which is either causing the ram to raise or is holding the ram in its raised position and will make a circuit to control 71 which delivers air to lower the ram. The vacuum head would again be lowered and engage the top sheet, the vacuum motor 60 remains energized during this entire period and will again attempt to draw an adequate vacuum on the sheet surface. With this control arrangement the presence or absence of a vacuum or a sheet at the vacuum head is continuously monitored and if at any time in the transfer of the sheet the sheet should fall the vacuum head will lower to re-engage the sheet and will continue to re-engage the sheet until it succeeds in drawing an adequate vacuum.

As was previously stated, the pivotal connection provided by pin 58 allows the vacuum head to move to accommodate any irregularities in the sheet parallel to the corrugations. As to proper alignment in a direction transverse to the corrugations, this can be set by the operator as he arranges the sheets in the stacking area. Screws 59 are shown at the front and rear of the vacuum head and function to guide the vacuum head corrugations into the sheet corrugations, but it has been observed that in some applications these can be eliminated.

After the sheet is properly raised it is transported to cutter 12. To achieve this trolley 24 is moved to the left in FIG. 1. The transfer drive for the trolley consists of drive motor 72 attached to the superstructure and a chain drive connected to the motor. A continuous chain 74 extends over sprockets 76 and 78 supported at longitudinally spaced points on the superstructure and has its opposite ends 80 and 82 connected to the trolley base frame 30. Sprocket 76 is connected to a sprocket (not shown) which is in turn connected by chain 86 to sprocket 88 driven by motor 72. Motor 72 is reversible and, with this arrangement, the trolley is moved either to the left or to the right along the superstructure depending on the direction of rotation of the motor. The track for movement of the trolley is provided by I-beam 90 which is part of the superstructure. Rollers 92 are attached to base frame 30 and are engaged on I-beam 90 to provide a form of carriage upon which the trolley moves with respect to the I-beam.

Limit switch 94 (see FIG. 2) supported on the trolley controls drive motor 72 when the trolley is as positioned in FIG. 1, namely over stacking area 20. The limit switch is positioned in the path of movement of the bracket assembly of the ram, specifically block 95 connecting brackets 54 and 56 and slidable on cylinder 32. When the ram is fully retracted block 95 engages and operates switch 94 to start motor 72. The motor drives sprocket 76 in a clockwise direction and through chain 74 pulls the trolley to the left. With only a single vacuum head being provided, that vacuum head is positioned to engage the sheet at the leading portion thereof and the trailing edge of the sheet drags over rollers 22.

A second limit switch 96 is supported from I-beam 90 and in the path of travel of the trolley. This limit switch is in circuit with drive motor 72 so that when engaged it de-energizes the drive motor bringing the trolley and sheet to rest. Additional functions are provided by switch 96 in that, when operated by movement of the trolley to the left as viewed in FIG. 1, it reverses the circuit to drive motor 72 so that when the motor is subsequently energized it will drive sprocket 76 in a counterclockwise direction. Limit switch 96 is also in circuit with vacuum motor 60 so that when operated in this manner it de-energizes the vacuum motor, interrupting the vacuum on the sheet and allowing the sheet to drop onto bed 16. In this respect, switch 96 can be in circuit with timer 66 to interrupt current to the timer so that the entire control arrangement of FIG. 7 is de-energized at this point.

The sheet is now positioned at the entrance to the cutter for movement into the cutter for the actual cutting operation. Movement of the sheet into the cutter is achieved by chain 97 which is driven by motor 98, chain 100 and sprockets 101, 103 and 105. Chain 97 moves beneath the sheet and is provided with a dog 102 which projects above the upper plane of rollers 22. When motor 98 is energized, dog 102 moves into engagement with the trailing edge of the sheet to transmit chain movement to the sheet.

A stop assembly 104 is arranged on the exit side of the cutter. At this point it should be noted that conveyor section 106 on the exit side of the cutter is not horizontal but is angled downwardly with respect to support bed 16 of conveyor section 14 and limit stop assembly 104 is positioned vertically above conveyor section 106. The limit stop assembly is supported on horizontally spaced rails 108 and is movable horizontally along those rails to vary the relative position between the stop assembly and the cutter. Actual engagement with the rails is made through an elongated flame 112 and legs 113 and the limit stop is fixed in place on the rails by thumb screw 109. The frame 112 supports a second air cylinder 114. The ram of this air cylinder is connected to bracket assembly 116 which carries an abutment assembly 118. When the ram is retracted abutment assembly 118 is positioned out of the horizontal line of travel of the sheets but with the ram extended the abutment assembly intersects the plane of movement of the sheets. This plane generally coincides with the upper plane of rollers 22 and the abutment assembly in its extended position projects through this plane of horizontal movement and when retracted is positioned above the plane, the dotted and full line showings in FIG. 1, respectively. The abutment assembly includes a striker plate 120 and a switch 122 arranged to be operated by the striker plate. Switch 122 is connected to and controls the drive 121 of cutter 12. Limit stop assembly 104 is controlled by switch 124 positioned below the area upon which the trolley deposits the sheets at the cutter entrance. A wire actuator 126 extends through bed 16 and as the sheet is dropped onto the bed the wire is moved downwardly operating switch 124 to operate air cylinder 114 to lower the abutment assembly and position it in the plane of sheet movement. The abutment assembly remains in this position so long as a sheet is in engagement with actuator wire 126.

Returning now to the movement of the sheets into and through the cutter, as dog 102 engages the trailing edge of the sheet it imparts motion to the sheet driving it into the cutter. The sheet passes through the cutter until its leading edge engages abutment assembly 118. The abutment assembly prevents further movement of the sheet. Motor 98 is connected to sprocket 101 through a slip-clutch arrangement 128 so that when the abutment assembly opposes movement of the sheet, and correspondingly the dog and chain, the drive engagement between motor 98 and the dog and chain is broken in the slip clutch and the sheet remains at rest against the abutment assembly.

The abutment assembly accurately locates the sheet with respect to the cutter blade (not shown) so that the preselected length of sheet can be cut. As stated above, engagement of the sheet with striker plate 120 actuates switch 122 to initiate the operation of the cutter. As the cutter severs the leading portion of the sheet, that portion falls onto conveyor 106 and by gravity travels on rollers 130 of that conveyor toward rolling machine 10.

When the leading portion of the sheet falls after the cutting operation, switch 122 is released deactivating the cutter and the drag is removed from the chain and dog so that the remaining portion of the sheet is again driven into and through the cutter. Assuming that the sheet is of such a length that more than one cut is to be taken, the leading edge of the sheet will again strike abutment assembly 118 and the just-described cutting operation will be repeated. The limit stop assembly 104 being adjustable on rails 108 provides a convenient arrangement for adjusting the length of the sections to be cut from the sheet.

When the series of cutting operations is completed the remaining or trailing portion of the sheet is moved into the cutter. In doing so the sheet releases actuator wire 126 allowing switch 124 to return to its normal position. Switch 124 in addition to controlling abutment assembly 118 also is in the circuit to drive motor 98. Motor 98 is a two-speed motor and with switch 124 actuated by depression of wire 126 it runs at the lower of its two speeds. When actuator wire 126 is released, the motor is switched to its high speed and then off. Accordingly, as the chain and dog move the sheet through the cutter and clear actuator wire 126 the motor is abruptly speeded up accelerating the chain and dog drive and correspondingly the sheet to impart sufficient momentum to the sheet to carry it through the cutter and onto conveyor 106. Clearing actuator wire 126 also operates air cylinder 114, through switch 124, to retract abutment assembly 118 so that it does not interfere with movement of the final sheet portion through the cutter.

Trolley 24 remains at the extreme left end of its travel over the delivered sheet until the cutter is initially energized. Upon actuation of switch 122 to energize the cutter for the initial cut in the sheet, the switch also reactivates motor 72 to return the trolley to its position over the stacking area. On return movement to that position, the trolley engages a limit switch 132 which de-energizes drive motor 72 and reverses the circuit to the motor so that the next time motor 72 is energized by switch 94, the trolley will be moved to the left. Thus, as the series of cuts in the sheets continues the trolley is returned to the stack area where it remains until actuator wire 126 is cleared whereupon switch 124 also completes the circuit to the lift assembly to repeat the lifting and transfer operation.

A switch 134 is located at the rolling station and is operated by actuator wire 135 which in turn is operated by the sheet sections delivered to the rolling machine. A flat conveyor end table 136 is positioned below conveyor 106. The sheet sections roll off of portion 106 onto portion 136 where they come to rest. Switch 134 is in circuit with motor 98 and maintains the circuit to that motor open so long as a sheet is positioned at the rolling machine. When the last sheet section is removed from table 136, switch 134 is operated to close the circuit to motor 98 and initiate movement of a subsequent sheet through the cutter. A new sheet will not move into the cutter until all of the cut sections have been removed from table 136. In this manner the cutting operation is coordinated with the rolling operation and additional sheet sections are delivered to the rolling machine only as required.

The illustrated apparatus also provides a mechanism for maintaining the network of tubing required for operation of the lift and vacuum assembly from tangling in the operative transfer area. More particularly, an elongated wire or rod 138 extends along the superstructure generally coextensive with the range of travel of trolley 24. A series of rings 140 engages the tubing at spaced points thereon and are supported on rod 138. With this arrangement the tubing retracts and expands in accordion fashion as the trolley moves to the left and right.

SUMMARY OF MACHINE OPERATION

Assuming that conveyors 14, 106 and 136 are free of corrugated sheet sections and that the trolley 24 is positioned as illustrated in FIG. 1, timer 66 will initiate operation by establishing a circuit to air control 67 to lower the vacuum head and will energize vacuum motor 60. The vacuum head will be held in engagement with the top sheet for a preselected time whereupon the timer will interrupt the circuit to control 67 and complete a circuit through switch 70 to control 71 to raise the sheet. Assuming an adequate vacuum were drawn, a sheet will have attached itself to the vacuum head and the lift assembly will continue to raise until block 95 engages switch 94 whereupon ram 34 is fully retracted and motor 72 will be energized to move trolley 24 to the left in FIG. 1. The timer will maintain energization of both "lift" control 71 and vacuum motor 60 during the movement of the trolley. If the sheet had not been initially lifted from the stack or if the sheet should fall from the vacuum head for any reason during either the lifting operation or movement of the sheet toward cutter 12, vacuum switch 70 will operate to interrupt energization of motor 72, if necessary, and relower the vacuum head to again attach itself to the sheet.

When trolley 24 approaches the entrance end of the cutter it engages switch 96 which de-energizes motor 72 and simultaneously interrupts the circuit to vacuum motor 60 and reverses the circuit to motor 72. The vacuum in the vacuum head is then broken and the sheet falls onto bed 16. The falling sheet engages actuator wire 126 to operate switch 124 which energizes motor 98 to drive chain 97. Dog 102 engages the trailing edge of the sheet and moves the sheet into and through the cutter. Operation of switch 124 will have also operated air cylinder 114 of the stop assembly to position abutment assembly 118 in the path of movement of the sheet. The leading edge of the moving sheet strikes plate 120. This interrupts movement of the sheet, the drag being accommodated in slip clutch 128, and also actuates switch 122 to activate cutter motor 121. The initial operation of switch 122 also energizes motor 72 to drive trolley 24 to the right and reposition it over the stacking area. On its return movement the trolley 24 engages switch 132 which stops motor 72 and also reverses the circuit to the motor so that upon subsequent motor actuation the trolley will move to the left.

After the cut has been made, the severed section of the sheet falls onto conveyor 106 and by gravity rolls to table 136 where it comes to rest at rolling machine 10. Removal of the severed portion releases the remainder of the sheet for movement by chain 97 and dog 102, the remainder of the sheet being driven into the cutter until its leading edge strikes abutment assembly 118 whereupon the cutting operation is repeated.

When the final cut has been made in the sheet, the trailing portion of the sheet is moved into the cutter by dog 102 and will eventually clear actuator wire 126. When switch 124 returns to its normal position it switches motor 98 to its high speed thereupon abruptly accelerating the sheet as it leaves conveyor section 114 to impart sufficient momentum to the sheet to carry it through the cutter and onto conveyor 106. Clearance of actuator wire 126 and operation of switch 124 also reactivates the trolley and lift assembly so that a second sheet is picked up by the trolley and delivered to the cutter. The second sheet will be deposited in the area at the entrance end of the cutter but motor 98 will not be reactivated until switch 134 is released indicating that all of the previously cut sections had been removed from table 136 and a further supply of sections is required at the rolling machine. When switch 134 is cleared, the cutting operation is repeated as described above.

Only the vacuum switch control circuit has been illustrated in the drawing. For convenience, the remaining circuitry has not been shown. Those skilled in the art can perceive the circuit connections for the various switches once they are aware of the functions to be performed by the switches, and those functions have been explained.

Although but one embodiment of the present invention has been illustrated and described, it will be apparent to those skilled in the art that various changes and modifications may be made therein without departing from the spirit of the invention.

What is claimed is:

1. Apparatus for transferring a work piece having an irregular surface, said apparatus comprising, in combination,
    a vacuum assembly including means defining an irregular work piece engaging surface having a depression therein and being generally resilient in an area generally surrounding said depression to establish a sealed engagement with a work piece,
    means communicating with said depression for connecting said depression to vacuum drawing apparatus so that said depression provides a vacuum area,
    means for moving said vacuum assembly selectively in a first direction to engage said work piece engaging surface with a work piece so that a vacuum can be drawn in said vacuum area to attach a work piece to said vacuum assembly and in a second direction different from said first direction to displace said work piece, and control means responsive to the presence and absence of a work piece at said work piece engaging surface, said control means connected to and operative to actuate said means for moving said vacuum assembly in said first direction in response to absence of a work piece at said work piece engaging surface.

2. Apparatus for transferring corrugated sheets comprising, in combination, a vacuum head assembly including
  a support portion having a generally corrugated surface,
  resilient sealing means attached to and projecting from said corrugated surface, said resilient sealing means having an outer, generally corrugated surface and having a depression at the outer surface thereof,
  means for drawing a vacuum,
  and means communicating with said depression for connecting said depression to said vacuum drawing means,
lift means connected to said vacuum head assembly for selectively raising and lowering said vacuum head assembly so that said vacuum head assembly is movable to engage said sealing means with a corrugated sheet for attachment of said corrugated sheet thereto,
first conveyor means for moving said vacuum head assembly horizontally to a point remote from the point of initial engagement of said vacuum head assembly with a sheet,
and control means responsive to the presence and absence of a vacuum condition and exposed to the vacuum condition in said depression, said control means connected to said lift means and operative in response to loss of vacuum in said depression to operate said lift means to move said vacuum head assembly downwardly toward engagement with a corrugated sheet.

3. The apparatus of claim 2 including an elongated frame having track means extending longitudinally of said frame,
  a trolley supporting said lift means and vacuum head assembly and including carriage means engaging said track means,
  drive means connected to said trolley and operative to propel said trolley between longitudinally spaced points on said track means,
  and said track means, trolley and drive means providing part of said first conveyor means.

4. Apparatus operatively associated with a cutting mechanism and comprising, in combination,
  a vacuum head assembly including
    a support portion having a generally corrugated surface,
    resilient sealing means attached to and projecting from said corrugated surface, said resilient sealing means having an outer, generally corrugated surface and having a depression at the outer surface thereof,
    means for drawing a vacuum,
    and means communicating with said depression for connecting said depression to said vacuum drawing means,
  lift means connected to said vacuum head assembly for selectively raising and lowering said vacuum head assembly so that said vacuum head assembly is movable to engage said sealing means with a corrugated sheet for attachment of said corrugated sheet thereto,
  first conveyor means communicating with a work station at a cutting mechanism for moving said vacuum head assembly horizontally between a first point remote from said work station and a second point adjacent said work station,
  first control means responsive to said vacuum head assembly reaching said second point and connected to said vacuum drawing means, said first control means operative when said vacuum head assembly reaches said second point to interrupt said vacuum and release a sheet from said vacuum head assembly,
  second conveyor means in the area of said second point for engaging and moving a sheet released from said vacuum head assembly into said work station,
  and locating means for positioning a sheet in said work station.

5. The apparatus of claim 4 wherein said cutting mechanism has entrance and exit ends and said second conveyor means communicates with said entrance end, and including
  third conveyor means communicating with said exit end for transporting sheets away from said cutting mechanism,
  and wherein said locating means includes stop means on the exit side of said cutting mechanism in the path of movement of sheets from said cutting mechanism.

6. The combination of claim 5 wherein said stop means is adjustable in a direction toward and away from said cutting mechanism to vary the length of section cut by said cutting mechanism.

7. The apparatus of claim 5 wherein said third conveyor means includes a bed angled downwardly and away from said exit end,
  said stop means is arranged above said bed and said locating means also including means for moving said stop means between first and second positions, said stop means in said first position being disposed in the path of movement of sheets leaving said cutting mechanism and in said second position being disposed out of said path of movement,
  and control means connected to said means for moving said stop means and responsive to the presence and absence of a sheet at the entrance end of said cutting mechanism to effect movement of said stop means respectively to said first and second positions.

8. The apparatus of claim 4 including an elongated frame having track means extending longitudinally of said frame,
  a trolley supporting said lift means and vacuum head assembly and including carriage means engaging said track means,
  drive means connected to said trolley and operative to propel said trolley between said first and second points on said track means,
  and said track means, trolley and drive means providing part of said first conveyor means.

9. The combination of claim 8 wherein said trolley drive means includes a reversible motor, and including first and second control switch means spaced longitudinally on said track means in positions corresponding to said longitudinally spaced points between which said trolley is movable, said control switch means responsive to the presence of said trolley at their respective positions to reverse said motor for return travel of said trolley to the other position.

10. The apparatus of claim 7 wherein
  said first conveyor means includes
    an elongated frame having track means extending longitudinally of said frame,
    a trolley on said track means and supporting said lift means and vacuum head assembly,
    and drive means connected to said trolley and operative to propel said trolley between said first and second points on said track means,
  and said stop means includes switch means controlling said trolley drive motor and operative to energize said motor to effect return movement of said trolley to the point remote from said cutting mechanism when a sheet strikes said stop means.

11. The apparatus of claim 7 wherein said second conveyor means includes a two-speed motor and said two-speed motor is controlled by said control means responsive to the presence and absence of a sheet at the entrance end of said cutting mechanism which control means is operative in response to movement of a sheet from said second conveying means to switch said motor to high speed simultaneously with effecting movement of said stop means to said second position.

12. The apparatus of claim 11 wherein said resilient sealing means comprises a resilient strip extending continuously around a confined area at the corrugated surface of said support portion and projects from said support portion corrugated surface for sealing engagement with a work piece.

13. The apparatus of claim 5 including a rolling station communicating with said third conveyor means,
and second control means at said rolling station responsive to the presence or absence of sheets at said rolling station and controlling said second conveying means, said second control means operative to energize said second conveying means to move a sheet into said cutting mechanism when said rolling station is free of sheets.

References Cited

UNITED STATES PATENTS

| | | | |
|---|---|---|---|
| 2,665,013 | 1/1954 | Socke | 214—1 |
| 2,809,769 | 10/1957 | Clarke | 214—1 X |
| 2,925,612 | 2/1960 | Schramm | 214—1 X |
| 3,322,454 | 5/1967 | Mindrum | 214—650 X |
| 3,351,370 | 11/1967 | Olson | 294—64 |

FOREIGN PATENTS

| | | |
|---|---|---|
| 212,556 | 1/1958 | Australia. |
| 1,408,335 | 7/1965 | France. |

GERALD M. FORLENZA, Primary Examiner

G. F. ABRAHAM, Assistant Examiner

U.S. Cl. X.R.

214—1, 8.5; 271—26; 294—64